E. BADE.
FLOWER POT.
APPLICATION FILED OCT. 7, 1908.
909,843.
Patented Jan. 12, 1909.
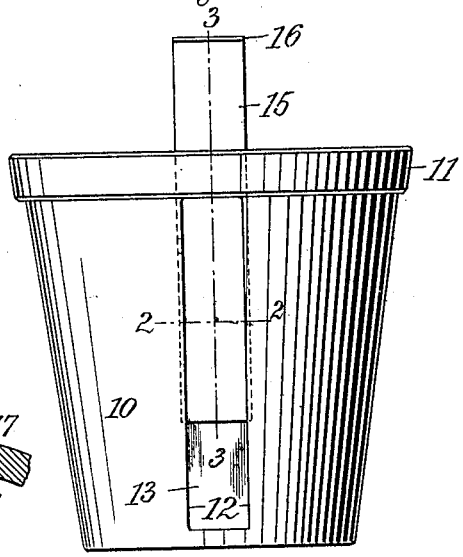
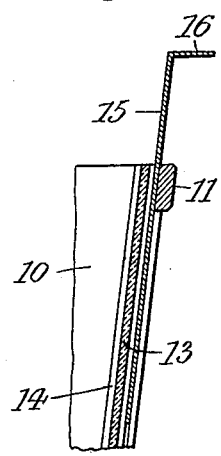
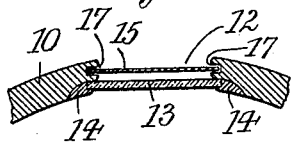
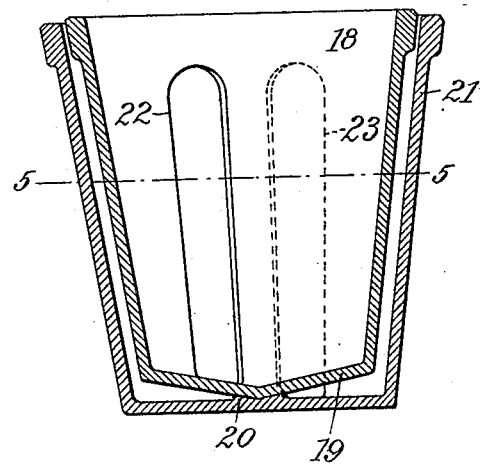
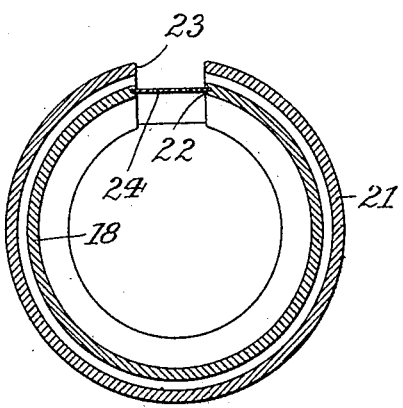
WITNESSES
INVENTOR
Ernst Bade
BY
ATTORNEY

UNITED STATES PATENT OFFICE.

ERNST BADE, OF NEW YORK, N. Y., ASSIGNOR OF ONE-HALF TO ALBERT PULVERMACHER, OF NEW YORK, N. Y.

FLOWER-POT.

No. 909,843.　　　　Specification of Letters Patent.　　　　Patented Jan. 12, 1909.

Application filed October 7, 1908. Serial No. 456,649.

*To all whom it may concern:*

Be it known that I, ERNST BADE, a citizen of Germany, residing at New York city, Brooklyn, county of Kings, State of New York, have invented new and useful Improvements in Flower-Pots, of which the following is a specification.

This invention relates to a flower pot which is so constructed that the condition of the soil and roots may be freely inspected whenever desired, while light, injurious to the plant, may be normally excluded from below the surface of the soil.

In the accompanying drawing: Figure 1 is a side elevation of a flower pot embodying my invention; Fig. 2 a cross section of part thereof on line 2—2, Fig. 1; Fig. 3 a vertical section on line 3—3, Fig. 1; Fig. 4 a vertical central section of a modification of the flower pot, and Fig. 5 a horizontal section on line 5—5, Fig. 4, showing the parts in a different position.

A flower pot 10, composed of clay or other porous material, is provided with a continuous upper rim or bead 11, and with an upright slot 12 extending from below said rim to the bottom of the pot. Along slot 12 the inner side of pot 10 is chamfered to accommodate a window 13 which covers the slot and is secured in position by a suitable cement 14. This window may be closed by an opaque slide or shutter 15 having handle 16, and engaging grooves 17 formed in the upright edges of pot 10 along slot 12. To accommodate this slide, bead 11 is notched across slot 12 in alinement with grooves 17. In this way the slide may be readily manipulated, while the continuous bead 11 prevents any undue weakening of the pot or the formation of objectionable edges at the top thereof. When the slide is raised, the condition of the soil, as to compactness, dryness or moisture, as well as the condition of the roots may be freely ascertained, so that the gardener is guided as to the proper treatment to be given to the plant. If the slide is lowered, all objectionable light is excluded from below the surface of the soil.

With the construction shown in Figs. 4 and 5, as inner flower pot 18 has a coned bottom 19, stepped into a corresponding bearing 20 of an outer pot 21. Inner pot 18 has a longitudinal slot 22 provided with window 24, while outer pot 21 has a corresponding, but open, slot 23. The diameters of pots 18, 21, are such that the former is snugly encompassed by the latter, but can be rotated within the same. When window 24 is brought opposite slot 23, (Fig. 5), the soil in pot 18 is exposed below its surface, while, when by rotating pot 18 the window is brought out of alinement with slot 23, (Fig. 4), the soil is covered and concealed.

I claim:

A flower pot having an upright longitudinal slot, a window within the slot, and means for closing said window, whereby the soil contained in the pot may be exposed or concealed below the surface thereof, substantially as specified.

Signed by me at New York city, (Manhattan,) N. Y., this 6th day of October, 1908.

ERNST BADE.

Witnesses:
　ALBERT PULVERMACHER,
　FRANK V. BRIESEN.